No. 641,925. Patented Jan. 23, 1900.
E. C. BLUNDELL.
WEEDING HOE.
(Application filed July 28, 1899.)

(No Model.)

Witnesses
Jas. N. Blackwood
Hartwell P. Heath

Inventor
Ernst Charles Blundell
by D. A. Gorrick
Attorney

THE NORRIS PETERS CO., PHOTO-LITHO., WASHINGTON, D. C.

UNITED STATES PATENT OFFICE.

EVERT CHARLES BLUNDELL, OF SIOUX CITY, IOWA.

WEEDING-HOE.

SPECIFICATION forming part of Letters Patent No. 641,925, dated January 23, 1900.

Application filed July 28, 1899. Serial No. 725,412. (No model.)

*To all whom it may concern:*

Be it known that I, EVERT CHARLES BLUNDELL, a citizen of the United States, residing at Sioux City, in the county of Woodbury and State of Iowa, have invented a new and useful Improvement in Weeding-Hoes, of which the following is a specification.

My invention relates to improvements in weeding-hose, and particularly to weeding-hoes used on a railway right-of-way, and has for its object to provide a light sharp blade capable of cutting the toughest weeds with slight exertion on the part of the operator, of passing between the ends of ties and under the rails between the ties, and of being moved horizontally along the ground, no matter what position the operator is required by the nature of the ground to adopt with reference to such blade. This object I accomplish in the manner and by the means hereinafter more fully described in detail and particularly pointed out in the claims, reference being had to the accompanying drawings, in which like reference-letters indicate like parts in both figures.

Figure 1:
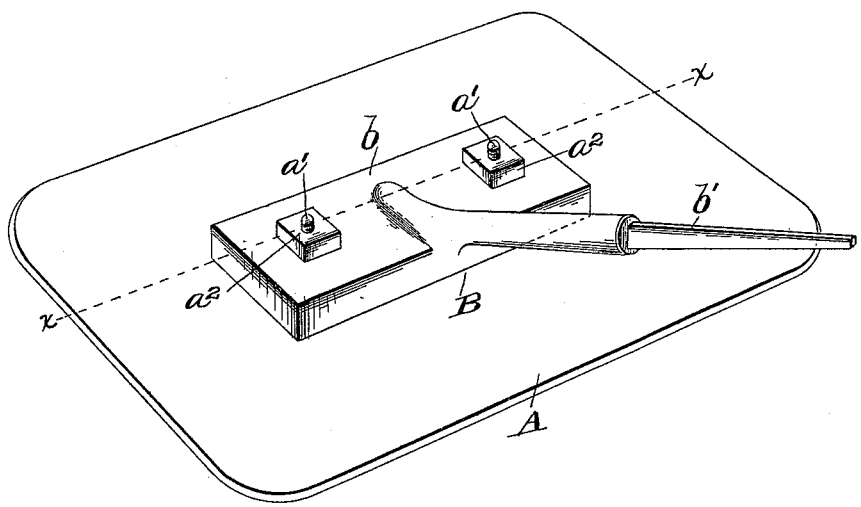
Figure 2:
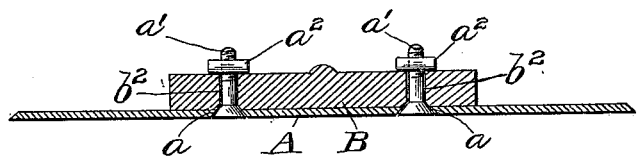

Figure 1 is a perspective view of my invention. Fig. 2 is a sectional view on line $x\ x$, Fig. 1.

My invention consists of a rectangular blade A with rounded corners and edges beveled from the top toward the bottom and is normally horizontal. In a line in the direction of the greatest length of the blade A and intermediate of its sides are two holes $a$, reamed out from the bottom of the blade A. A tang B, with a rectangular base $b$, has an arm $b'$ rising diagonally from the center of said base $b$ and made integral with said base $b$. Said base $b$ is provided with two holes $b^2$, which register with the holes $a$. The tang B is secured to the upper surface of the blade A by bolts $a'$, passing through the holes $a$ and $b^2$ and secured by nuts $a^2$. The arm $b'$ is adapted to receive a wooden handle. The tang B is solid and heavy and serves to prevent the hoe rising as it is drawn or pushed against weeds in cutting them, thus enabling the weeds to be cut close to the surface of the ground without the exertion of any energy to keep the blade A on the ground.

Having thus described my invention, what I claim as new, and desire to secure by Letters Patent, is—

1. In a weeding-hoe, a weighted tang provided with an inclined upwardly-projecting arm to receive the handle and adapted to be removably secured to the upper surface of the blade, substantially as shown and described.

2. In a weeding-hoe, the combination of a weighted tang and a horizontal rectangular blade with rounded corners and edges beveled from the top toward the bottom, substantially as shown and described.

3. A weeding-hoe consisting of a rectangular horizontal blade with rounded corners and edges beveled from the top toward the bottom; a weighted tang provided with an inclined upwardly-projecting arm to receive the handle, and adapted to be removably secured to said blade and a handle adapted to be placed on said arm, substantially as shown and described.

In testimony whereof I hereto affix my signature in the presence of two witnesses.

EVERT CHARLES BLUNDELL.

Witnesses:
 PHILIP R. WALDER,
 CHARLES B. DODDER.